United States Patent
Fermann et al.

(10) Patent No.: US 7,414,780 B2
(45) Date of Patent: Aug. 19, 2008

(54) ALL-FIBER CHIRPED PULSE AMPLIFICATION SYSTEMS

(75) Inventors: Martin E. Fermann, Dexter, MI (US);
Gennady Imeshev, Ann Arbor, MI (US);
Gyu C. Cho, Ann Arbor, MI (US);
Zhenlin Liu, Ann Arbor, MI (US);
Donald J. Harter, Ann Harbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 154 days.

(21) Appl. No.: 10/992,762

(22) Filed: Nov. 22, 2004

(65) Prior Publication Data

US 2005/0105865 A1    May 19, 2005

Related U.S. Application Data

(63) Continuation-in-part of application No. 10/608,233, filed on Jun. 30, 2003, now Pat. No. 7,257,302.

(60) Provisional application No. 60/539,110, filed on Jan. 27, 2004.

(51) Int. Cl.
*H01S 3/00* (2006.01)

(52) U.S. Cl. ............. 359/337; 359/337.5; 398/160

(58) Field of Classification Search .......... 359/337, 359/337.5; 398/160
See application file for complete search history.

(56) References Cited

U.S. PATENT DOCUMENTS

| 6,249,630 | B1 | 6/2001 | Stock et al. |
| 6,621,040 | B1 | 9/2003 | Perry et al. |
| 6,804,045 | B2 * | 10/2004 | Barty ........................ 359/337 |
| 7,072,101 | B2 * | 7/2006 | Kapteyn et al. .......... 359/337.5 |

FOREIGN PATENT DOCUMENTS

WO    WO 2006/113507 A2    10/2006

OTHER PUBLICATIONS

L. Kuznetsova, et al., Interplay of nonlinearity and gain shaping in femtosecond fiber amplifiers, Optics Letters, Sep. 1, 2006, pp. 2640-2642, vol. 31, No. 17.

* cited by examiner

*Primary Examiner*—Mark Hellner
(74) *Attorney, Agent, or Firm*—Sughrue Mion, PLLC

(57) ABSTRACT

By compensating polarization mode-dispersion as well chromatic dispersion in photonic crystal fiber pulse compressors, high pulse energies can be obtained from all-fiber chirped pulse amplification systems. By inducing third-order dispersion in fiber amplifiers via self-phase modulation, the third-order chromatic dispersion from bulk grating pulse compressors can be compensated and the pulse quality of hybrid fiber/bulk chirped pulse amplification systems can be improved. Finally, by amplifying positively chirped pulses in negative dispersion fiber amplifiers, low noise wavelength tunable seed source via anti-Stokes frequency shifting can be obtained.

21 Claims, 13 Drawing Sheets

— 10-microjule pulse

— 2-microjule pulse

— 10-microjule pulse

— 2-microjule pulse

ALL-FIBER CHIRPED PULSE AMPLIFICATION SYSTEMS

CROSS-REFERENCES TO RELATED APPLICATIONS

This is a Continuation-In-Part of U.S. application Ser. No. 10/608,233 filed on Jun. 30, 2003, now U.S. Pat. No. 7,257,302, the entire disclosure of which is hereby incorporated by reference. This application claims benefit of the filing date of the Provisional Application Ser. No. 60/539,110, filed on Jan. 27, 2004. The Provisional Application Ser. No. 60/539,110 is incorporated herein by reference for all it discloses.

TECHNICAL FIELD OF THE INVENTION

The present invention is direct to the construction of ultra-compact high-energy fiber pulse sources.

DESCRIPTION OF RELATED ART

Over the last several years, fiber lasers and amplifiers have been regarded as the most promising candidates for ultrafast pulse sources for advanced industrial applications due to their unique simplicity of construction. In general, ultrafast optical pulses have a pulse width of less than 50 picoseconds. Chirped pulse amplification is implemented to enable the amplification of such pulses to the microjoule-millijoule energy range. Generally, chirped pulse amplification systems use a near bandwidth-limited seed pulse source, which is temporally stretched (i.e., chirped) in a pulse stretcher before amplification in a power amplifier. After amplification, the pulses are recompressed to approximately the bandwidth limit using a pulse compressor.

Commercially viable fiber chirped pulse amplification systems were suggested U.S. Pat. No. 5,499,134 issued to A. Galvanauskas et al. The system disclosed in U.S. Pat. No. 5,499,134 relied upon chirped fiber Bragg gratings for pulse stretching. Chirped fiber Bragg gratings have indeed been developed into widely available devices and the chirp inside the Bragg gratings can be designed to be linear or even non-linear to compensate for any order of dispersion in a chirped pulse amplification system (see U.S. Pat. No. 5,847,863 to A. Galvanauskas et al.), which is important for the generation of near bandwidth limited pulses after pulse recompression.

Generally, in such systems as a compromise between system compactness and high-energy capability, the use of a chirped fiber Bragg grating pulse stretcher in conjunction with a bulk grating pulse compressor is advantageous, providing at least partial integration for the high-energy fiber amplifier system. Alternative arrangements resorting to the use of bulk stretchers and compressors (as generally used in the state of the art) are generally much more difficult to align, require a significantly larger amount of space for their operation and are only of limited utility in real industrial applications.

Recently, M. Fermann et al. in U.S. patent application Ser. No. 10/608,233 suggested the use of apodized nonlinearly chirped fiber gratings to minimize the mismatch in the dispersion profile between fiber grating pulse stretchers and bulk grating pulse compressors, thereby greatly improving the utility of chirped fiber grating pulse stretchers.

As a further simplification, M. Fermann et al. in U.S. patent application Ser. No. 10/608,233 suggested the use of dispersive photonic crystal fiber as a replacement for bulk grating pulse compressors. The use of dispersive photonic crystal fiber pulse compressors further enables compact fiber beam delivery, i.e., the delivery of an optimally short pulse propagating in a fiber delivery section of extended length onto a specific target material downstream from said fiber delivery section.

For reference, we refer to photonic crystal fiber, as a fiber with a central hole, filled with air (or any other gas) where waveguiding is enabled through photonic bandgaps in the fiber cladding. In contrast, a holey fiber uses guiding in a central glassy core surrounded by holes filled with air (or any other gas) in the cladding. A conventional fiber allows for waveguiding in a core with a refractive index higher than the surrounding cladding and does not use any air-holes anywhere in the fiber cross section.

U.S. Pat. Nos. 6,236,779 and 6,389,198 to J. Kafka et al. suggest the use of low-dispersion holey fibers for beam delivery. However, in contrast to holey fibers, photonic crystal fibers can exhibit substantial linear and higher-order dispersion. Therefore, the delivery of an optimally short optical pulse onto a target material by simply substituting a holey fiber with a photonic crystal fiber is not generally possible.

Moreover, the work by Kafka et al. assumed the use of substantially polarization maintaining holey fibers for beam delivery. No provision was made to accommodate non-polarization maintaining fibers for beam delivery and no provision was made to implement holey fiber as dispersion compensating elements in chirped pulse amplification systems.

U.S. Pat. No. 5,303,314 issued to I. N. Duling et al. suggested the use of Faraday rotator mirrors to provide a single-polarization output from a non-polarization maintaining fiber amplifier. U.S. Pat. No. 5,303,314 did not suggest, however, the use of Faraday rotator mirrors in conjunction with photonic crystal fibers. Moreover, because of the negligible values of first and second order polarization mode dispersion in typical non-polarization maintaining fiber amplifiers, U.S. Pat. No. 5,303,314 did not consider the use of Faraday rotators for the compensation of second-order polarization mode dispersion.

The generation of high-energy pulses in fiber-based chirped pulse amplification systems is generally facilitated with the use of large core fiber amplifiers and specifically large core diffraction limited multi-mode amplifiers, as described in U.S. Pat. No. 5,818,630 issued to M. E. Fermann et al. Recently, M. E. Fermann et al., in U.S. patent application Ser. No. 09/576,722, disclosed modular, widely tunable fiber chirped pulse amplification systems that further enhanced the utility of such fiber laser sources in industrial applications. This modular system suggested the use of an amplitude filter in conjunction with a nonlinear power amplifier for compensation of higher order dispersion in the chirped pulse amplification system. However, M. E. Fermann et al. did not suggest any independent control of second and third-order dispersion with such an amplitude filter. Moreover, Fermann et al., did not suggest the use of a nonlinear amplifier for higher-order dispersion compensation in the presence of gain-narrowing and gain-pulling in the fiber amplifier.

David J. Richardson et al., in U.S. Patent Publication No. 2003/0156605, described system implementations aimed at the amplification of femtosecond-picosecond pulses with fiber amplifiers. Just as in U.S. patent application Ser. No. 09/576,722, Richardson et al. describe a chirped pulse amplification system for the generation of the highest peak power pulses. Also, just as in U.S. patent application Ser. No. 09/576,722, Richardson et al. describe the exploitation of parabolic pulse formation in fiber amplifiers to generate femtosecond pulses in the energy range up to 1-10 microjoules.

However, Richardson et al. did not suggest controlling the third-order dispersion in such fiber amplifiers.

The modular system disclosed in U.S. patent application Ser. No. 09/576,722 also suggested the use of an anti-Stokes frequency-shifting fiber in conjunction with an Er fiber laser for injection seeding of an Yb amplifier chain. Of all possible methods for seeding of ultrafast Yb fiber amplifiers, anti-Stokes frequency shifting of an ultra-fast Er fiber laser from the 1.55 micrometer wavelength region to the 1.05 micrometer wavelength region is considered to be the most attractive. The reason is that ultrafast Er fiber lasers can be assembled from standard telecom components, thereby greatly reducing the cost of such systems. Ideally, such a seed source is also tunable in order to allow pulse injection in the complete spectral gain band of Yb fibers, spanning a wavelength range of 980-1150 nanometers.

Recently, U.S. Pat. No. 6,618,531 to T. Goto et al. suggested another tunable short pulse source based on intensity dependent frequency shifting of a short pulse laser source. The tunable source in U.S. Pat. No. 6,618,531 relies on a linear variation of the output pulse frequency with input intensity. No tunable short pulse laser source was suggested that does not rely on linear intensity dependent frequency shifting in an optical fiber. Moreover, U.S. Pat. No. 6,618,531 does not address stability issues for an anti-Stokes frequency shifted fiber laser. Although anti-Stokes frequency shifting may produce a certain desired output wavelength, generally, such a source may not comply with the stability requirements of commercial laser sources. One of the reasons is that anti-Stokes frequency shifting is a highly nonlinear process; hence, tiny seed source variations can produce large amplitude fluctuations. Specifically, the presence of stimulated Raman scattering processes that may accompany anti-Stokes frequency shifting, implemented according to U.S. Pat. No. 6,618,531, can produce very large amplitude fluctuations.

SUMMARY OF THE INVENTION

The invention has been made in view of the above circumstances and has an object to overcome the above problems and limitations of the prior art, and describes ultra-compact ultra-high power fiber amplifier systems for pulses in the fs to ps pulse width range.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

The presented invention relates to the design of ultra-compact high energy chirped pulse amplification systems based on linearly or nonlinearly chirped fiber grating pulse stretchers and photonic crystal fiber pulse compressors. Alternatively, photonic crystal fiber pulse stretchers and photonic crystal fiber compressors can also be implemented. For industrial applications the use of all-fiber chirped pulse amplification systems is preferred, relying on fiber-based pulse compressors and stretchers as well as fiber-based amplifiers.

Fiber-based high energy chirped pulse amplification systems of high utility can also be constructed from conventional optical components such as pulse stretchers based on long lengths of conventional fiber as well as bulk grating compressors. The performance of such 'conventional' chirped pulse amplification systems can be greatly enhanced by exploiting nonlinear cubicon pulse formation, i.e. by minimization of higher-order dispersion via control of self-phase modulation inside the amplifiers.

Finally, a particularly compact seed source for an Yb fiber-based chirped pulse amplification system can be constructed from an anti-Stokes frequency shifted modelocked Er fiber laser amplifier system, where a wavelength tunable output is obtained by filtering of the anti-Stokes frequency shifted output. The noise of such an anti-Stokes frequency shifted source is minimized by the amplification of positively chirped pulses in a negative dispersion fiber amplifier.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DETAILED DESCRIPTION OF THE INVENTION

A detailed description of the preferred embodiments of the invention will now be given referring to the accompanying drawings.

Figure 1:
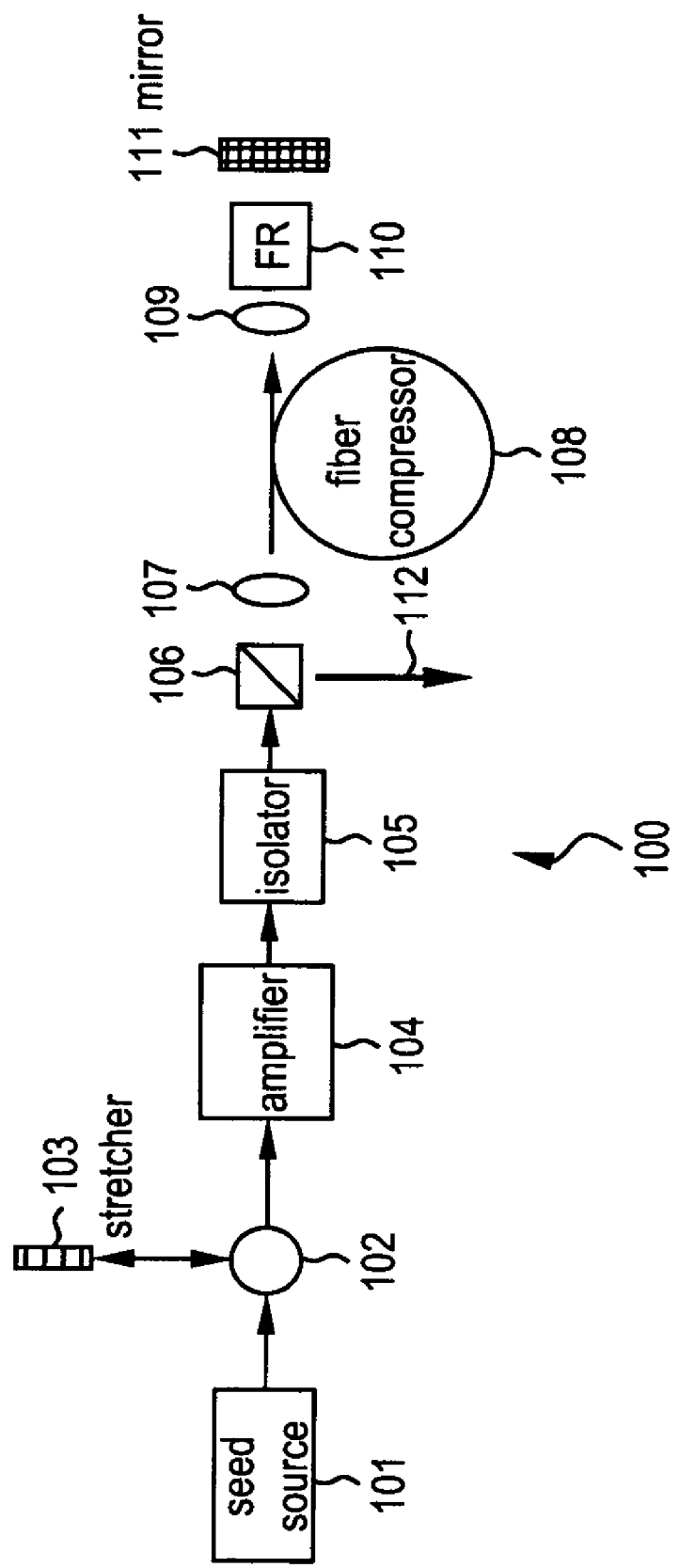
FIG. 1 is a diagram of a generic scheme for a chirped pulse amplification system based on a fiber grating pulse stretcher and a non-polarization maintaining photonic crystal pulse compressor.

FIG. 1 represents an exemplary embodiment of a chirped pulse amplification system 100 according to the present invention. The system comprises a short pulse seed source 101. The seed source 101 generally supplies pulses having a width less than 50 picosecond. The pulses from seed source 101 are injected into an optical circulator 102 and a fiber Bragg grating stretcher 103 temporally stretches the pulses by at least a factor of ten. All-fiber circulators or bulk optic equivalents of optical circulators can be implemented. U.S. patent application Ser. No. 10/608,233, which is incorporated by reference for all it discloses, discusses such circulators, which will not be further described. The stretched pulses are then directed via the circulator output to an optical amplifier system 104. The optical amplifier system 104 can comprise a bulk-optic multi-pass amplifier, a regenerative amplifier, a parametric amplifier as well as a fiber based amplifier system. In general, optical amplifier systems involve complex optical arrangements and the use of separate pump sources. However, these types of amplifiers are well known in the state of the art and are therefore not separately discussed here.

The output from amplifier 104 is subsequently directed via an isolator 105, a polarization beam splitter 106 and a lens 107 into a photonic crystal fiber compressor 108. Photonic crystal fibers are generally designed with central guiding air-holes that maximize the power handling capability of such fibers. For an optimum chirped pulse amplification system, highly dispersive photonic crystal fibers (characterized by providing large values of chromatic dispersion) are preferable. In general, the control of the polarization state in such highly dispersive photonic crystal fibers is very difficult, and small perturbations in the bandgap structure within such fibers can cause significant first and second order polarization mode-dispersion. Randomly distributed birefringence within such fibers characterizes first order polarization mode dispersion. Randomly distributed wavelength-dependent birefringence within such fibers characterizes second order polarization mode dispersion.

However, a Faraday mirror can compensate for any first and second order polarization mode-dispersion inside the fiber compressor 108. The Faraday mirror comprises a collimating lens 109, a Faraday rotator 110 and a mirror 111. When implementing a 45° rotating Faraday rotator 110, a double-pass through fiber compressor 108 ensures that the backward reflected light propagating through the fiber compressor 108 is in exactly the opposite polarization state compared to the forward propagating light. For a substantially wavelength independent Faraday rotator, the opposite polarization state is obtained in the backward propagating direction regardless of wavelength.

Because the pulses are not compressed after the forward pass through the fiber compressor 108, in systems where peak powers are below the damage threshold of the step-index fiber, a fiber pigtailed Faraday rotator mirror (FRM) with a short pigtail made from conventional step-index fiber may be implemented instead of the collimating lens 109, the Faraday rotator 110 and the mirror 111.

Hence, after a double pass through the fiber compressor 108, temporally compressed output pulses can be extracted in a polarization state orthogonal to the polarization state of the pulses injected into the fiber compressor 108. The polarization beam splitter 106 extracts these orthogonally polarized pulses, and the pulses are designated here with arrow 112.

Figure 2A:
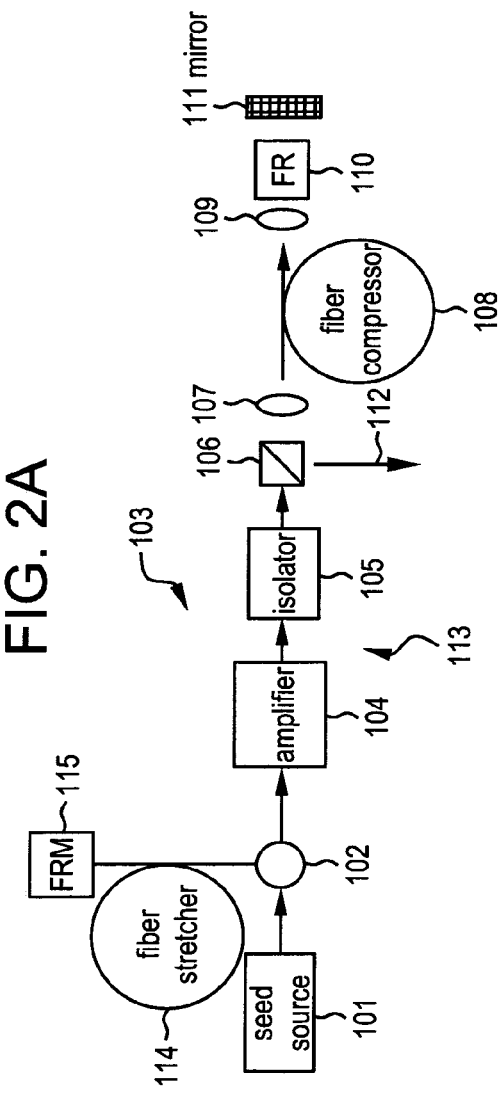
FIG. 2a is a diagram of a generic scheme for a chirped pulse amplification system based on a photonic crystal pulse stretcher and a non-polarization maintaining photonic crystal pulse compressor.

Though the use of fiber Bragg grating pulse stretchers in conjunction with photonic crystal fiber pulse compressors provides a very compact system set-up, group delay ripple in fiber Bragg grating pulse stretchers is difficult to control and can produce undesirable backgrounds in the compressed output pulses. This problem can be avoided by implementing photonic crystal fibers both for pulse stretching as well as pulse recompression. An exemplary implementation of such a system 113 is shown in FIG. 2a. The system displayed in FIG. 2a is nearly identical to the system displayed in FIG. 1, and the identical reference numerals will be used for the common elements. The fiber Bragg grating stretcher 103 is replaced, however, with a photonic crystal fiber pulse stretcher 114 in conjunction with a Faraday rotator mirror 115. The Faraday rotator mirror (FRM) 115 is used to compensate polarization mode dispersion in the photonic crystal fiber pulse stretcher 114, as in the example described in FIG. 1. A fiber pigtailed FRM 115 can be implemented, where the pigtailed FRM 115 can be directly spliced to the photonic crystal fiber stretcher 114, ensuring a very compact set up. The FRM pigtail 115 can be made from conventional step-index fiber.

Figure 2B:
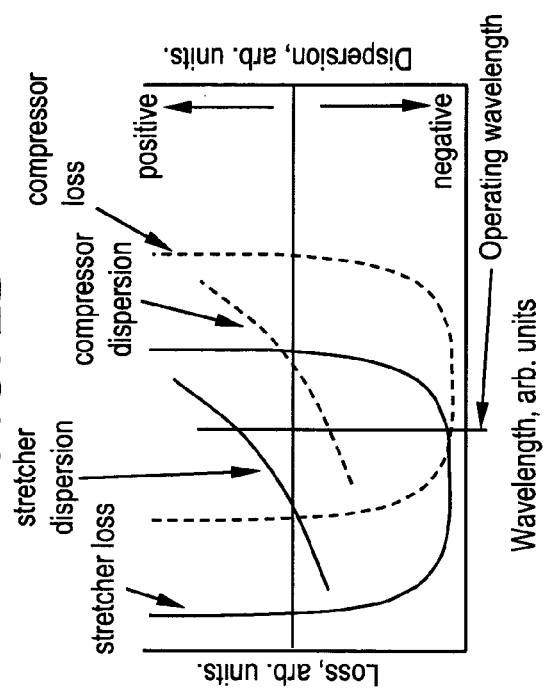
FIG. 2b is a diagram of the approximate optimal location of the photonic bandgaps of photonic crystal fibers when used for pulse stretching and recompression.

To use a photonic crystal fiber both for pulse stretching as well as pulse compression, two photonic bandgap fibers of different design need to be used, i.e., the location of the photonic bandgaps in the two fibers must be different, such that the dispersion of the two photonic bandgap fibers are approximately opposite. Referring to FIG. 2b, the pulse stretcher has a bandgap center blue-shifted compared to the compressor bandgap center. The stretcher-compressor designation is arbitrary here, as the opposite configuration is also possible.

Figure 3:
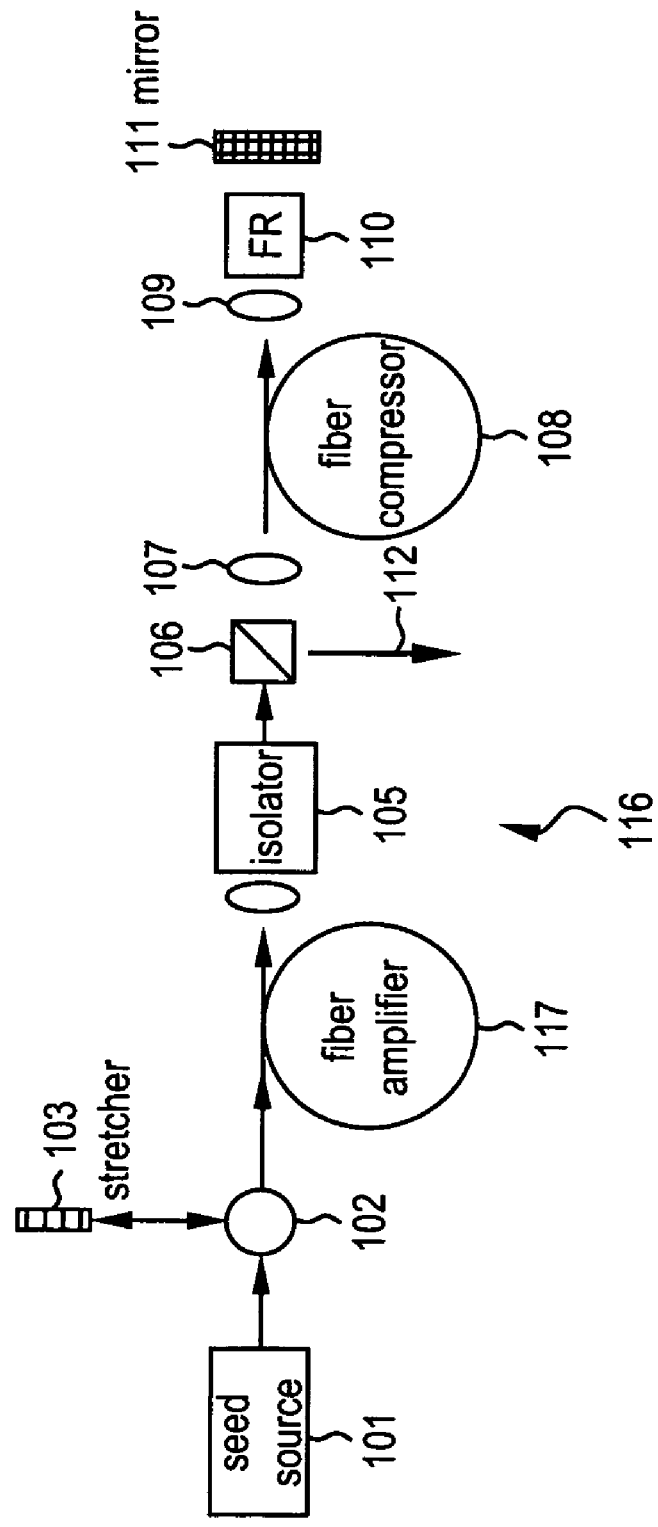
FIG. 3 is a diagram of a generic scheme for a fiber-based chirped pulse amplification system based on a fiber grating pulse stretcher and a non-polarization maintaining photonic crystal pulse compressor.

Particularly compact high-energy pulse amplification systems can be realized by the incorporation of optical fibers not only in the pulse stretching and compression stages, but also in the amplification stages. Referring to FIG. 3, a system 116 is shown, which is very similar to system 100, and the identical reference numerals will be used for the common elements. The amplifier system 104 is replaced with a fiber amplifier 117. Though FIG. 3 shows only one fiber amplifier, fiber amplifier chains with additional pulse-picking or down-counting optical modulators or isolators can be used to generate high energy pulses. U.S. patent application Ser. No. 10/608,233 discloses such fiber amplifier chains. Preferably, fiber amplifiers that handle the largest optical intensities are constructed from large mode polarization maintaining fiber.

A specific design implementation of a system according to FIG. 3 uses a seed source 101 based on a modelocked Er fiber laser that provides 400 femtosecond near bandwidth limited pulses with an average power of 5 milliwatts at a repetition rate of 50 megahertz and a wavelength of 1558 nanometers.

The spectral width of the source was 7.6 nanometers. The pulses from the Er laser were stretched via a fiber grating pulse stretcher 103 to a width of 100 picoseconds. The fiber grating pulse stretcher was designed with a second-order (chromatic) dispersion value of 26.8 $ps^2$ and a third-order (chromatic) dispersion value of 1.02 $ps^3$ to approximately match the chromatic dispersion of the photonic crystal fiber compressor 108.

For simplicity, only a single Er fiber amplifier 117 was used in this specific design example. The Er fiber amplifier produced an output power of 70 milliwatts at a wavelength of 1558 nanometers. The Er fiber amplifier was further isolated at each end from the rest of the optical components. The isolator at the input end to the fiber amplifier 117 is not shown; the isolator at the output of the fiber amplifier 117 is the isolator 105. An additional length of conventional step-index single-mode fiber was inserted between the fiber stretcher 103 and the fiber circulator 102 for fine control of the chromatic dispersion of the whole system.

Note that the pulse energy generated in the present fiber amplifier 117 is only 1.4 nanojoules. In order to increase the pulse energy, additional fiber amplifiers stages and pulse pickers need to be incorporated, e.g., as discussed in U.S. patent application Ser. No. 10/608,233.

The photonic crystal fiber compressor 108 has a length of 9.56 meters. The central air-hole had a diameter of 6 micrometers. The photonic bandgap was centered at 1515 nanometers and had a spectral width of nearly 200 nanometers. At 1560 nanometers, the photonic crystal fiber had a loss of less than 0.2 dB/m, i.e., a transmission of around 30% could be achieved in a double-pass through the photonic crystal fiber, comparable to the transmission loss of typical bulk grating compressors. The dispersion of the photonic crystal fiber was measured separately using standard techniques well known in the state of the art. The dispersion of the photonic crystal fiber was used as the input parameter for the design of the fiber Bragg grating pulse stretchers as explained above.

Without the use of the Faraday rotator mirror (components 109-111), the pulses at the output 112 from the system were not compressible and exhibited large pedestals. These pedestals could not be eliminated when using broad-band polarization control with quarter- and half-waveplates at the input to the compressor. The spectrum of the pulses transmitted through the photonic bandgap fiber as observed through a polarizer exhibited close to 100% modulation, with the shape dependent on the input polarization state. This is a clear indication of first and second-order polarization mode-dispersion in the photonic crystal fiber compressor.

Figure 4:
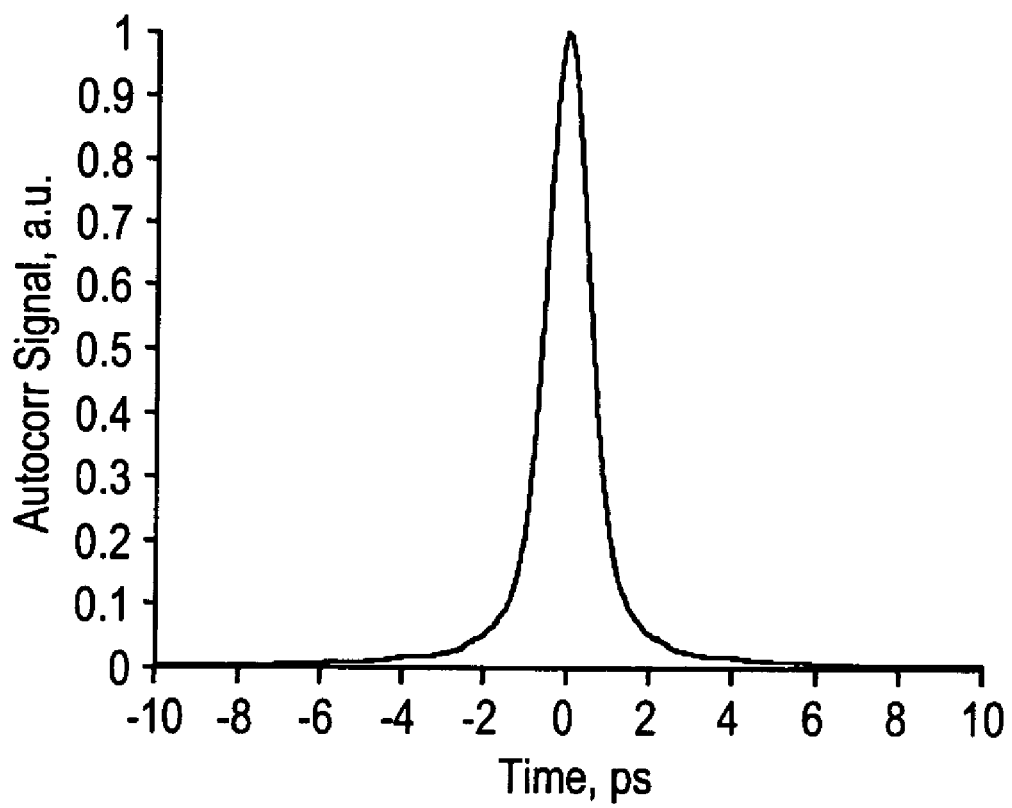
FIG. 4 is an autocorrelation of a recompressed pulse obtained with a specific Er fiber based chirped pulse amplification system based on a photonic crystal fiber compressor.

In contrast, when inserting the Faraday rotator mirror, high quality, compressed pulses were obtainable at output 112. An autocorrelation of the compressed pulses is shown in FIG. 4. The pulses have a temporal half width of around 800 femtoseconds and are within a factor of two of the bandwidth limit. The deviation from the bandwidth limit is attributed to some residual un-compensated third-order dispersion between the fiber Bragg grating stretcher 103 and the photonic crystal fiber compressor 108 which can be eliminated with improved design parameters for the fiber Bragg grating stretcher.

Figure 5A:
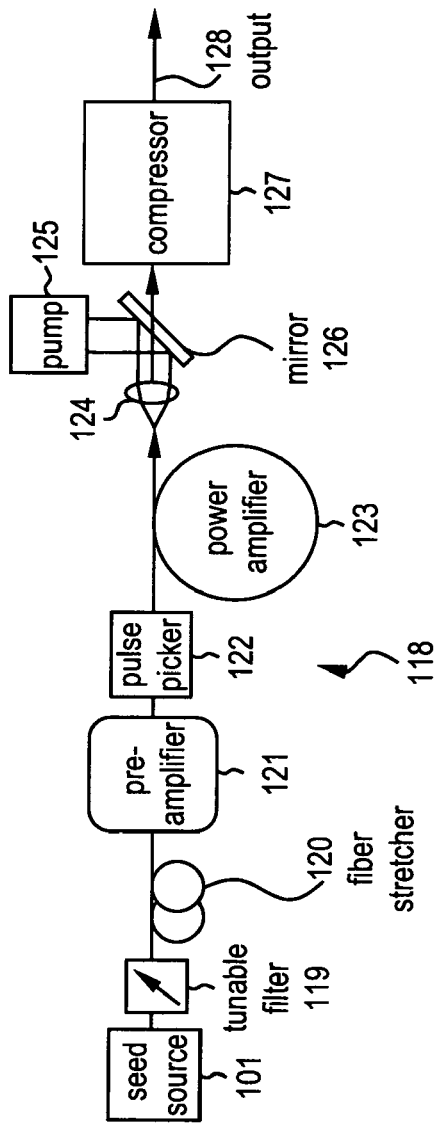
FIG. 5a is a diagram of a specific Yb fiber-based chirped pulse amplification system based on a fiber pulse stretcher and a conventional bulk grating pulse compressor in conjunction with an optical bandpass filter enabling the control of third-order dispersion via self-phase modulation in a nonlinear power amplifier.

Though the previous descriptions related to highly integrated and ultra-compact chirped pulse amplification systems, some applications can tolerate more conventional system concepts relying on the use of conventional fiber stretchers, fiber amplifiers and bulk grating compressors. In order to obtain high quality pulses from such systems, the control of higher-order dispersion and self-phase modulation is critical. A chirped pulse amplification system allowing for independent control of second- and third order dispersion is shown in FIG. 5. In an exemplary embodiment, a seed source 101 based on a passively modelocked Yb fiber laser was used. Such passively modelocked Yb fiber lasers were previously described in application Ser. No. 10/627,069 and are not further described here. The seed source 101 produces positively chirped optical pulses with a bandwidth of 16 nanometers at a repetition rate of 43 megahertz with an average power of 16 milliwatts. The peak emission wavelength of the oscillator was 1053 nanometers. The pulses from the seed source were compressible to a pulse width of less than 150 femtoseconds, demonstrating that the chirp from the seed source was approximately linear. The output from the seed laser passed through an isolator (not shown) and a tunable bandpass filter 119 with a 15 nanometer bandwidth.

After the bandpass filter 119, an output power of 5 milliwatts was obtained and a fiber stretcher 120 was used to stretch the pulses to a width of approximately 100 picoseconds. The fiber stretcher employed for producing stretched pulses had a length of approximately 200 meters and was based on conventional polarization maintaining single-mode step-index fiber. In FIG. 5, the tunable bandpass filter 119 is shown inserted before the fiber stretcher 120; alternatively, the tunable bandpass filter 119 can also be inserted after the fiber stretcher 120 (system implementation is not separately shown).

A subsequent Yb-based polarization maintaining pre-amplifier 121 amplifies the stretched pulses to an average power of 500 milliwatts. A pulse picker 122, based on an acousto-optic modulator and pig-tailed with polarization maintaining fiber, reduces the repetition rate of the pulses to 200 kilohertz, resulting in an average power of 1 milliwatt. The pulses from the pulse picker 122 were subsequently injected into a large-mode polarization maintaining Yb fiber power amplifier 123 and amplified to an average power of 950 milliwatts. The Yb power amplifier had a length of 3 meters and the fundamental mode spot size in the Yb power amplifier was around 25 micrometers. All fibers were either spliced together with their polarization axes aligned or connected to each other (with their polarization axes aligned) with appropriate mode-matching optics (not shown). The power amplifier 123 was cladding pumped via a lens 124 with a pump source 125, delivering a pump power of about 10 watts at a wavelength of 980 nanometers. A beam splitting mirror 126 was implemented to separate the pump light from the amplified signal light. The amplified and stretched pulses from the power amplifier 123 were compressed in a conventional bulk optics compressor 127 based on a single diffraction grating with a groove density of 1200 lines/mm, operating near the Littrow angle. Such bulk optics compressors are well known in the state of the art and are not further explained here. After the bulk optics compressor 127, the output 128 contained pulses with a full-width half-maximum (FWHM) width of around 330 femtoseconds and an average power of 440 milliwatts, corresponding to a pulse energy of 2.2 microjoules.

Figure 6A:
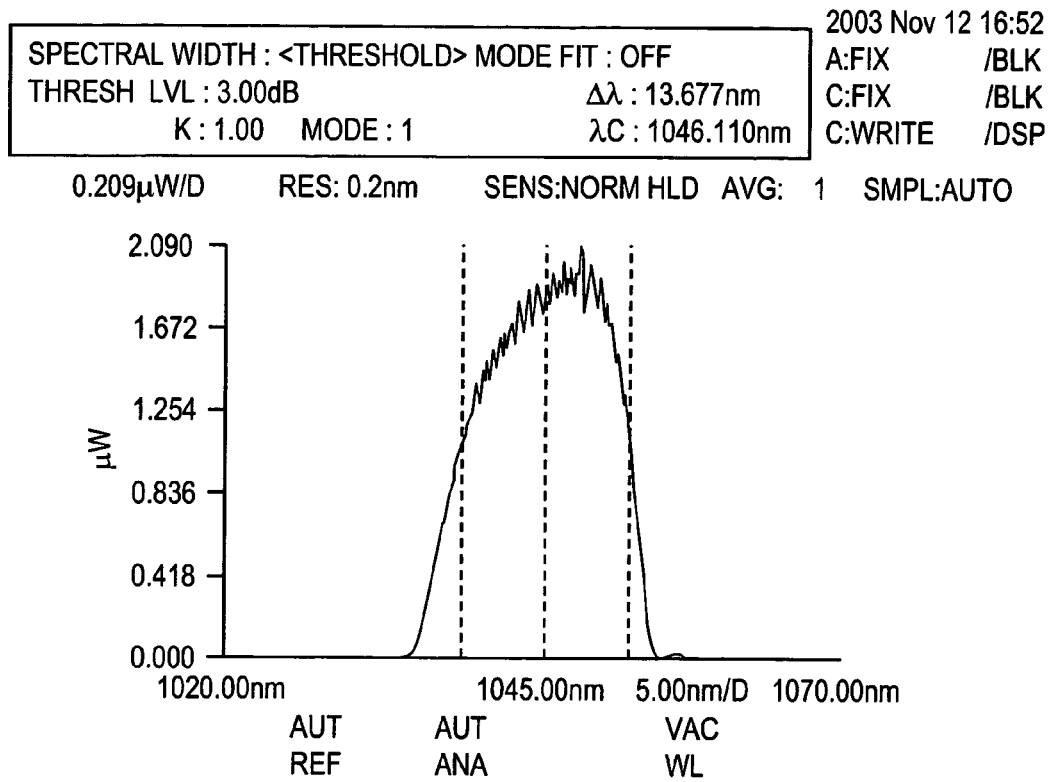
FIG. 6a is an illustration of a typical optimum pulse spectrum injected into a specific Yb power amplifier that is part of a fiber-based chirped pulse amplification system.
Figure 6B:
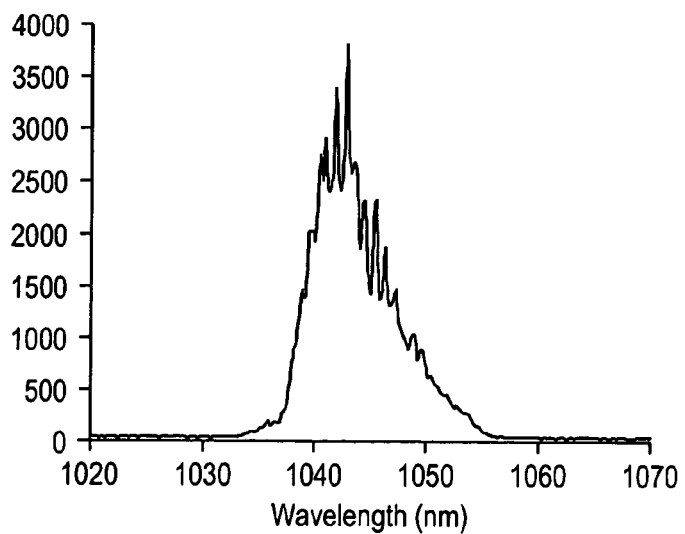
FIG. 6b is an illustration of a typical pulse spectrum obtained at the output of a specific Yb power amplifier that is part of a fiber-based chirped pulse amplification system.
Figure 6C:
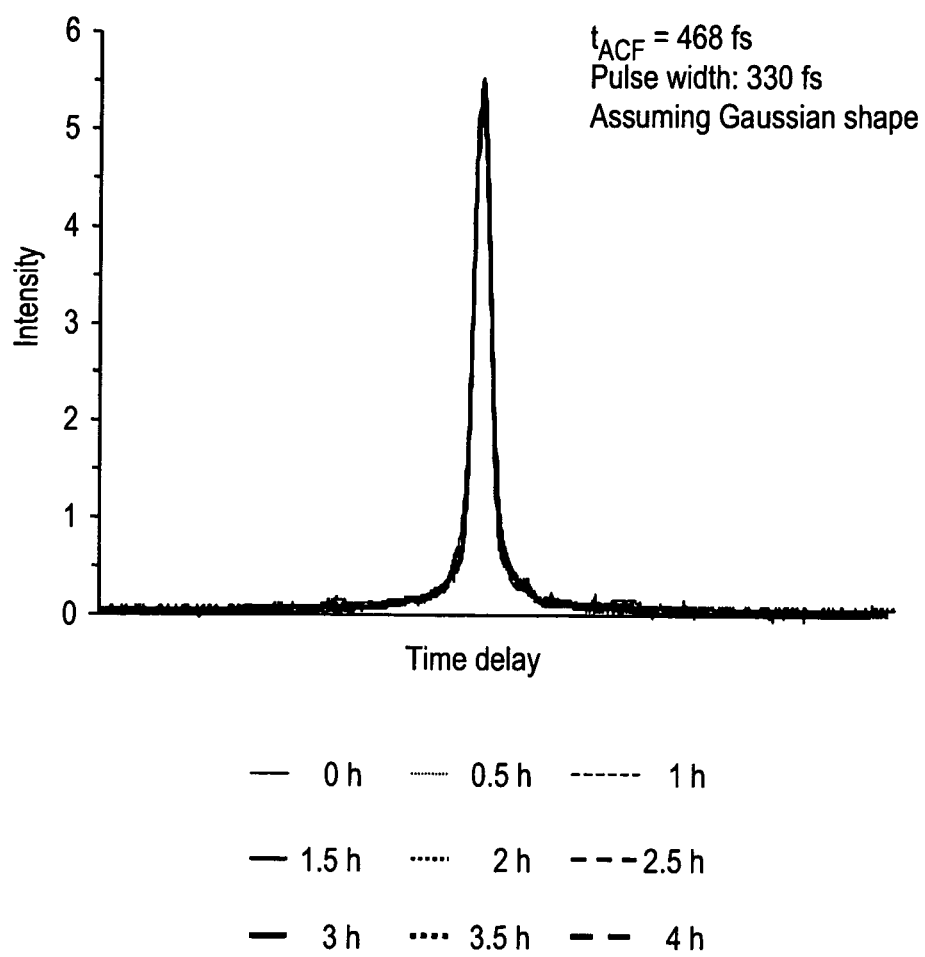
FIG. 6c is an illustration of a typical autocorrelation trace obtained with the compressed output of a specific Yb power amplifier that is part of a fiber-based chirped pulse amplification system.

The pulse spectrum injected into the power amplifier is shown in FIG. 6a, the pulse spectrum obtained after the power amplifier is shown in FIG. 6b and the corresponding autocorrelation of the compressed output pulses is shown in FIG. 6c. As evident from the autocorrelation trace, a very good pulse quality can be obtained from the present system. Moreover, a comparison of FIGS. 6a and 6b shows that there is significant gain-narrowing in the power amplifier. Moreover, due to gain-pulling, the peak of the spectrum blue shifts by around 5 nanometers between the input and output spectrum. Gain-pulling arises because the peak gain of the Yb amplifier is around 1030-1040 nanometers, whereas the injected pulse spectrum is centered around 1048 nanometers. A shift of the average optical frequency in the amplification process may further characterize gain-pulling.

Gain-pulling preferentially amplifies the blue spectral components of the injected pulse spectrum, which in the presence of self-phase modulation generates a larger phase delay for the blue spectral components compared to the red spectral components. This spectrally dependent nonlinear phase delay is equivalent to an added negative third-order dispersion in the stretched output pulses. For a certain output power and a certain input pulse spectrum, the positive third-order dispersion from the fiber stretcher and bulk grating compressor can thus be completely compensated.

In addition to gain-narrowing and gain pulling, gain depletion can further induce nonlinear contributions to $2^{nd}$ and $3^{rd}$ order dispersion via resonant dispersion as well as resonant self-phase modulation. Resonant dispersion arises from the optical phase-modulation associated with the population difference between the upper and lower gain level in the amplifier and is well known in the state of the art. Resonant self-phase modulation arises from the time-dependent change in population difference between the upper and lower gain level in the amplifier during substantial levels of gain depletion by one single pulse during the amplification process. Resonant self-phase modulation is known mainly from semiconductor physics, but is occurs also in fiber gain media. Though in the present example these resonant amplifier effects provide only a small contribution to the value of nonlinear dispersion, resonant effects can be used to modify and optimize the amount of nonlinear dispersion created during the amplification process.

Because stretched pulses can accumulate significant levels of third-order dispersion in the presence of self-phase modulation, gain-narrowing, gain-pulling and gain depletion, we suggest to refer to such pulses as cubicons. More generally, we can define a cubicon as a pulse that produces controllable levels of at least linear and quadratic pulse chirp in the presence of at least substantial levels of self-phase modulation (corresponding to a nonlinear phase delay >1) that can be at least partially compensated by dispersive delay lines that produce significant levels of second and third-order dispersion as well as higher-order dispersion. (Please note that for the compensation of linear pulse chirp, a dispersive delay line with second order dispersion is required, whereas for the compensation of quadratic pulse chirp, a dispersive delay line with third order dispersion is required and so on for higher orders of pulse chirp.) For a dispersive delay line to produce a significant level of $2^{nd}$ and $3^{rd}$ as well as possibly higher-order dispersion, the stretched pulses are typically compressed by more than a factor of 30. In addition cubicons can also be formed in the presence of resonant amplifier dispersion, gain narrowing, gain pulling as well as gain depletion, where we refer to gain depletion as an appreciable reduction in gain due to a single pulse.

In this particular example, the stretched pulses are compressed by a factor of around 300. In this, a compression factor of two can be attributed to gain narrowing in the power amplifier; without cubicon formation the minimum compressed pulse widths would be limited to around 600-800 fs, corresponding to a compression factor of only 70. Cubicon formation in the power amplifier allows pulse compression down to 330 fs.

Note that in contrast to the highly asymmetric—near triangular—spectral shapes of cubicons, parabolic pulses (sometimes also referred to as similaritons by those familiar with the state of the art) as discussed in U.S. patent application Ser. No. 09/576,722, preferably have a highly symmetric—near parabolic-pulse spectrum.

Referring back to FIGS. 5 and 6, simulations based on an application of the nonlinear Schrödinger equation show that for stretched pulses with a width of around 100 picoseconds, an optimum compensation of third-order dispersion in the system is obtained at a nonlinear phase delay of about $\pi$-$2\pi$. An optimum injection spectrum has a spectral width of around 8-14 nanometers and the position of the peak of the injected pulse spectrum is ideally red-shifted by around 4-20 nanometers from the peak of the Yb power amplifier gain profile. As mentioned above, the present Yb amplifier had a peak spectral gain at around 1030-1040 nanometers. Hence, an ideal injected pulse spectrum is centered between 1035-1060 nanometers, and preferably between 1044-1054 nanometers.

A signature of the nonlinear compensation of third-order dispersion in fiber chirped pulse amplification systems is an improvement in pulse quality observed with an increase in pulse energy or pump energy in the presence of self-phase modulation in the final amplifier. Note that pulse quality has to be distinguished from the pulse width. For example in a similariton pulse amplifier, the compressed pulse width generally decreases with an increase in pulse energy level as discussed in U.S. patent application Ser. No. 09/576,722. However, the corresponding improvement in pulse quality is small. Note that pulse quality can be defined for example as the ratio: (full width half-maximum pulse width)/(root mean square pulse width); both those two definitions are well known in the state of the art. In contrast in cubicon pulse amplifiers, the compressed pulse width also decreases with an increase in pulse energy level, however, the improvement in pulse quality is generally larger, moreover, substantial pulse wings as induced by mismatched third-order dispersion between pulse stretcher and compressor can be greatly suppressed. In contrast, similariton pulse amplifiers cannot compensate the mismatch of third-order dispersion between pulse stretcher and compressor. The signature for a system that include this invention is to observe the temporal pulse quality and measure the higher order dispersion terms. It will be noted that the higher order dispersion decreases with higher pulse energy. Another surprising observable is that the spectrum can have additional ripple due to self-phase modulation but the pulse quality improves. Pulse quality improvement means a shorter or same pulse width with less energy in the wings. In conventional fiber optic systems additional self phase modulation ripple will reduce the pulse quality.

Also, in conventional chirped pulse amplification systems, the pulse quality tends to deteriorate with an increase in energy level, especially in the presence of self-phase modulation in the final amplifier. The improvement in pulse quality with pulse energy is further illustrated in FIGS. 7a and 7b, showing the autocorrelation trace of compressed pulses at a pulse energy of 10 and 2 microjoules (FIG. 7a) as well as the corresponding pulse spectra (FIG. 7b) obtained with the system configuration shown in FIG. 5 with some small modifications explained below.

In order to increase the obtainable pulse energy to 10 microjoules, the fiber stretcher 120 was increased to a length of 500 meters and the compressor 127 was changed to comprise a bulk compressor grating with a grating period of 1500 l/mm. Also, a second pre-amplifier and a second pulse picker were inserted in front of the power amplifier 123, which are not separately shown. To enable the generation of pulses with an energy up to 10 microjoules at an average output power of around 1 watt (corresponding to an output power of 500 milliwatts after pulse compression), the pulse repetition rate was reduced to 50 kilohertz with the second pulse picker, whereas the 2 microjoule results were obtained at a pulse repetition rate of 200 kilohertz.

Figure 7A:
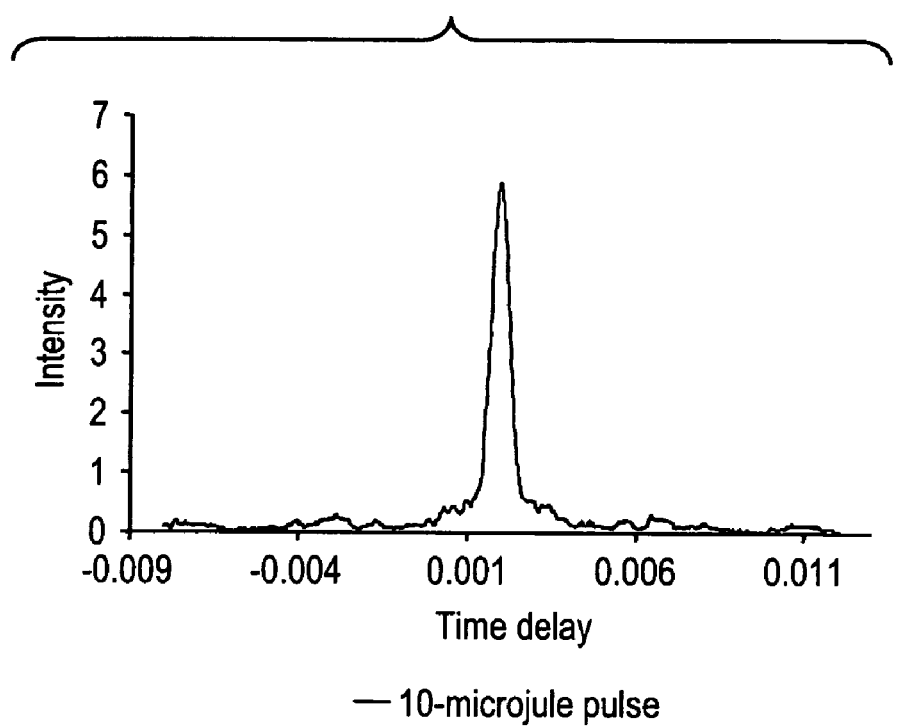
FIG. 7a is an illustration of a typical autocorrelation trace obtained with the compressed output of a specific Yb power amplifier that is part of a fiber-based chirped pulse amplification system at pulse energies of 10 and 2 microjoules.
Figure 7A:
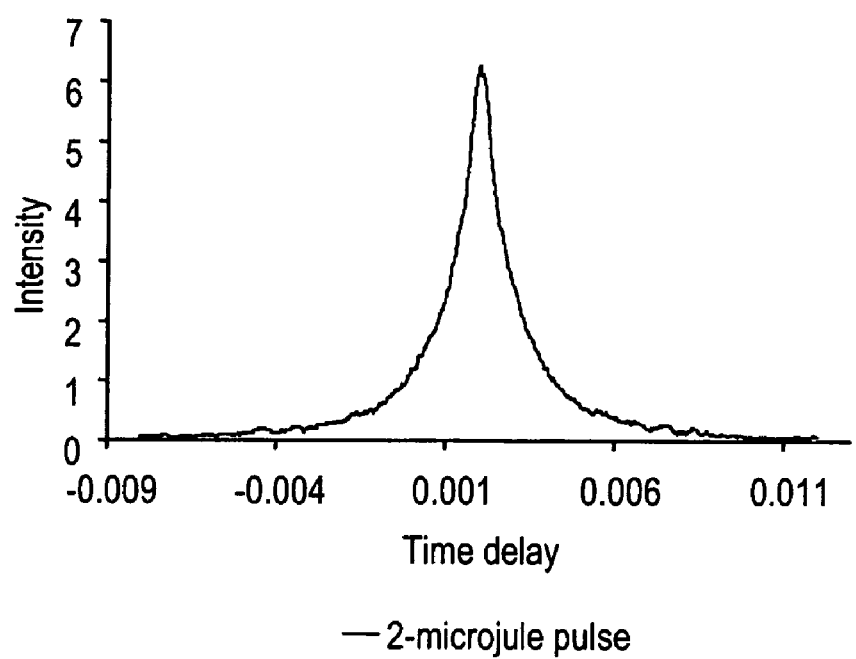
Figure 7B:
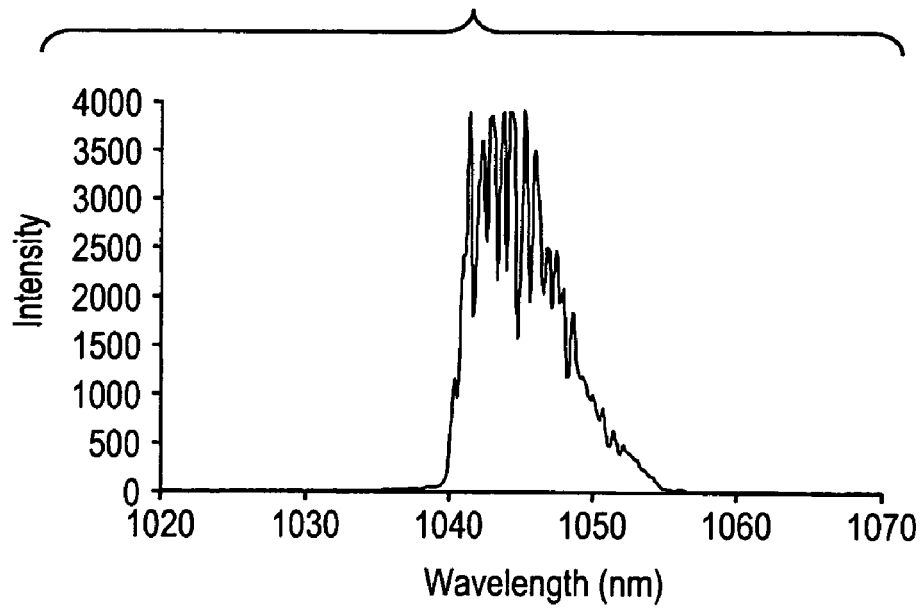
FIG. 7b is an illustration of a typical pulse spectrum obtained at the output of a specific Yb power amplifier that is part of a fiber-based chirped pulse amplification system at pulse energies of 10 and 2 microjoules.
Figure 7B:
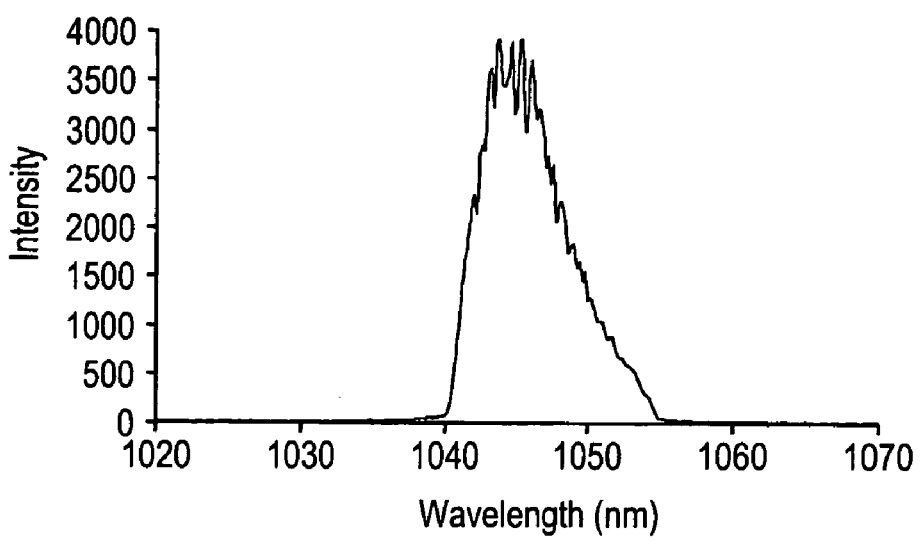
Figure 7C:
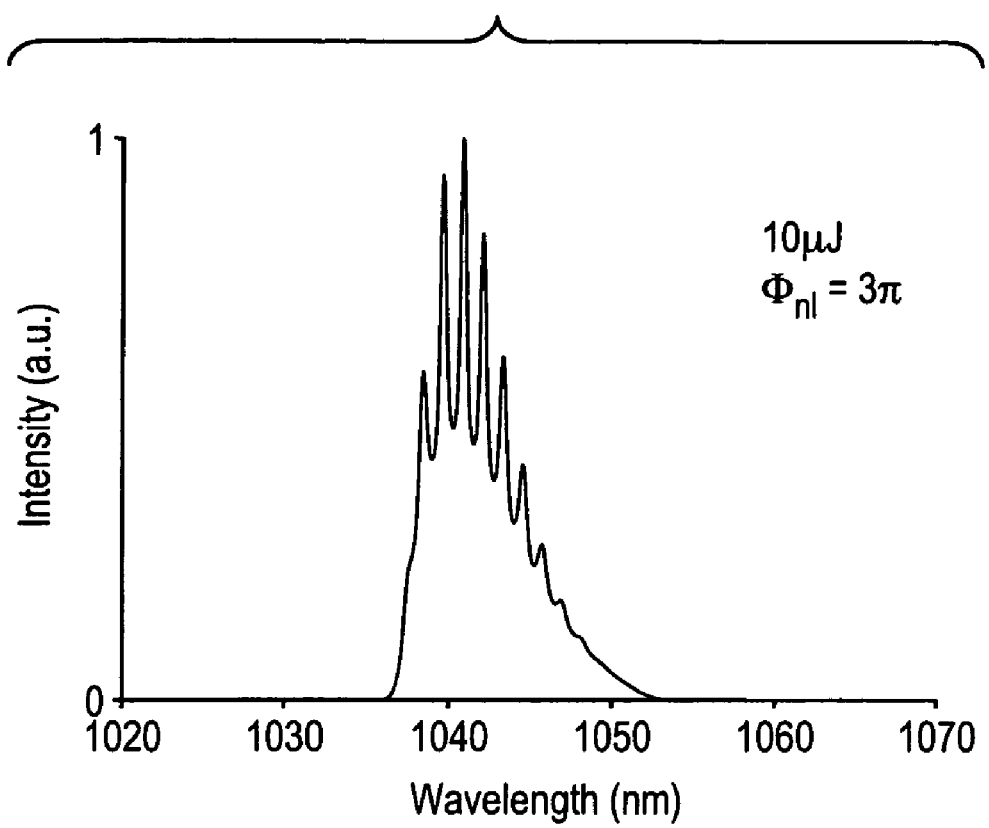
FIG. 7c is an illustration of a theoretically calculated pulse spectrum obtained at the output of the Yb power amplifier used in a fiber-based chirped pulse amplification system as in FIGS. 7 and 7b at pulse energies of 10 and 2 microjoules.
Figure 7C:
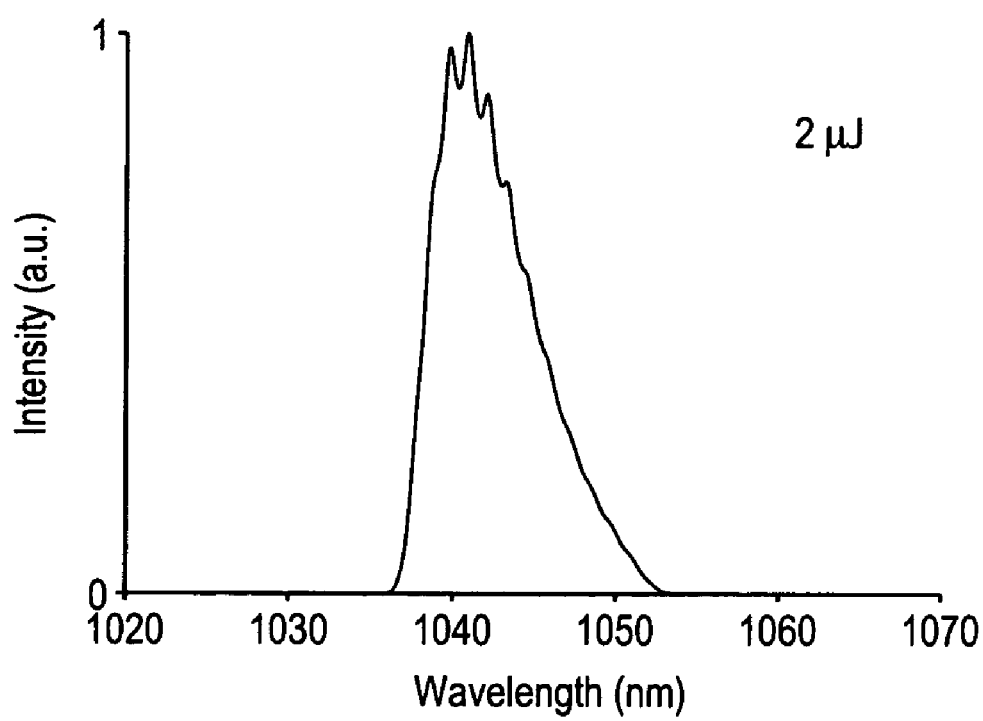

With the system configuration having a 500 meter fiber stretcher length, pulses with an energy of 2 microjoules exhibited some distinct extended tails due to third-order dispersion as shown in FIG. 7a, whereas the pulse spectrum shown in FIG. 7b is of high quality and only weakly modulated. The pulse width is around 730 femtoseconds. When increasing the pulse energy to 10 microjoules, the extended pulse tails are greatly suppressed and a pulse width of around 400 femtoseconds is obtained, as shown in FIG. 7a. In contrast, the spectral quality deteriorates for 10 microjoules, as evident from the increased modulation in the pulse spectrum shown in FIG. 7b. From computer simulations, it can be shown that the level of self-phase modulation in the power amplifier 123 for a pulse energy of 10 microjoules is around 2-4π. The peak power of the stretched pulses in the power amplifier can be calculated to be between 100-200 kilowatts. The result of the computer simulations, showing pulse spectra at 10 and 2 microjoules of pulse energy is further shown in FIG. 7c. A very good correspondence between the experimental results from FIG. 7b and the theoretical simulations in FIG. 7c is evident. A clear signature of operating a fiber power amplifier in chirped pulse amplification systems at large levels of self-phase modulation is the increase in spectral amplitude ripple with an increase in pulse energy, as shown in FIGS. 7b and 7c.

From these calculations, it can further be shown that the amount of tolerable self-phase modulation in a fiber power amplifier that is part of a chirped pulse amplification system increases with pulse stretching, at least the maximum achievable pulse energy is expected to increase linearly with fiber stretcher length. When using a fiber stretcher length of 2000 meters, a nonlinear phase delay between 3-10π can be tolerated even for imperfect seed pulses into fiber power amplifiers as in the present experimental configuration.

Stimulated Raman scattering typically occurs for levels of self-phase modulation between 10-20π. With the present experimental configuration, pulse energies up to 100 microjoules are possible for a fiber stretcher length of 2000 meters and a nonlinear phase delay of around 3-10π inside the power amplifier. To ensure that such high-levels of self-phase modulation are tolerated, the level of spectral amplitude ripple of the pulse spectra injected into the power amplifier needs to be further minimized. Techniques for minimizing spectral ripple in fiber chirped pulse amplification systems were already described in U.S. patent application Ser. No. 10/608,233 and are not further discussed here.

Generally, optimal fiber chirped pulse amplification systems can be characterized by employing simple fiber stretchers for pulse stretching and by exhibiting an improvement in pulse quality observed with an increase in pulse energy at levels of pulse energy where appreciable third-order dispersion and self-phase modulation occurs. This third-order dispersion is dominantly provided by a conventional bulk grating compressor, which produces a level of third-order dispersion 2-10 times larger compared to the third-order dispersion of a standard single-mode fiber operating at a wavelength of 1050 nanometers. Self-phase modulation is provided by amplifying pulses with a sufficient pulse energy. Optimum is a level of self-phase modulation between 0.3-10π. A clear signature of appreciable self-phase modulation in the power amplifier is an increase in spectral modulation with an increase in pulse energy.

The pulse quality is further improved by the presence of gain-narrowing and gain-pulling to shorter wavelengths. The amplified spectral width should be less than 10 nanometers in the wavelength range from 1030-1060 nanometers, whereas gain-pulling should produce a shift in the spectral peak by around 1-10 nanometers between the injected and amplified pulse spectrum. Moreover, an optimum injection spectrum to enable pulse cleaning in the presence of self-phase modulation should be centered in the wavelength range from 1035-1065 nanometers.

Figure 8:
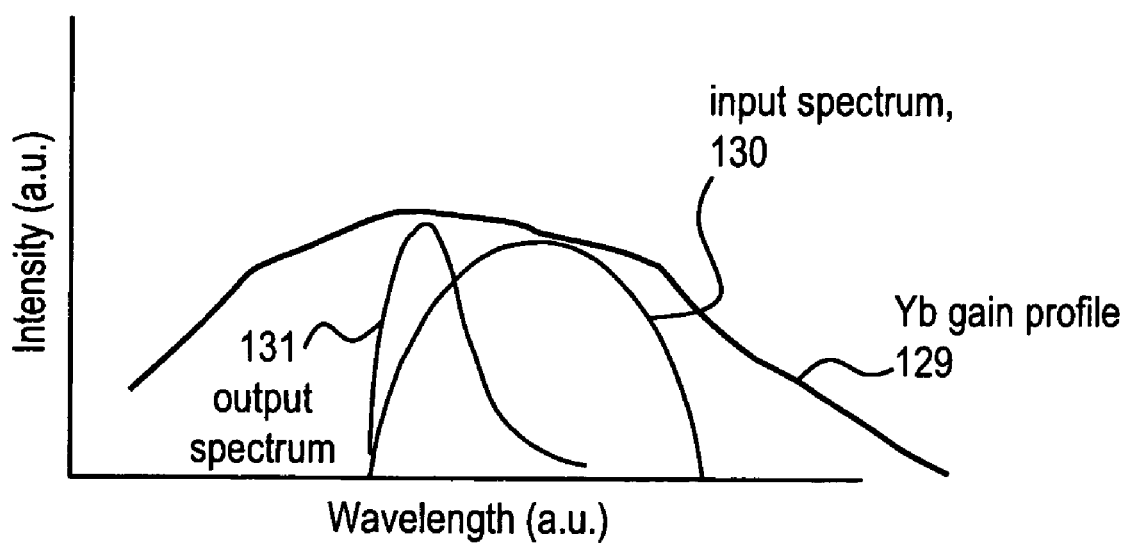
FIG. 8 is an illustration of an optimum pulse spectrum with respect to a typical Yb amplifier gain spectrum as utilized for the control of third-order dispersion in a nonlinear high-power Yb amplifier.

The effect of gain-pulling in the present Yb power amplifier is further illustrated in FIG. 8. The Yb gain profile in the power amplifier is represented with line 129. An optimum input spectrum into the power amplifier is represented with line 130. A typical gain-narrowed output spectrum is represented with line 131. A parabolic spectral input is shown only as an example; in general, any spectral input shape can be used and the effect of gain-pulling can still be observed.

The system illustrated in FIG. 5 is a great simplification to the prior art, (U.S. patent application Ser. No. 09/576,722), where an arbitrary (and very costly) amplitude filter was disclosed to enable higher-order dispersion control via self-phase modulation. The key simplification in the present system is that no complex amplitude filter is required, rather via the the effects of gain-narrowing and gain-pulling, the fiber gain medium itself acts like a self-optimized amplitude filter, already optimized to produce a near optimum in compressed pulse quality. Another key simplification in the system illustrated in FIG. 5 is that the implementation of the tunable bandpass filter 119 allows for essentially independent control of third- and second order dispersion, i.e., the third-order dispersion of the system can be solely manipulated by adjusting the center wavelength of the input spectrum via tunable bandpass filter 119. Though the adjustment of the tunable bandpass filter 119 also affects the second-order dispersion of the system, the second-order dispersion can be subsequently minimized by simply adjusting the dispersive optical path in the bulk grating compressor 127.

A specific deterministic alignment method for the tunable bandpass filter 119 can, for example, take advantage of measuring the compressed pulse phase via a frequency-resolved optical gating (FROG) instrument (or any other pulse phase retrieval technique). In this, a FROG trace is first linearized by adjustment of the tunable bandpass filter 119, which minimizes third-order dispersion in the system. The autocorrelation width extracted from the FROG trace is subsequently minimized by adjustment of the dispersive optical path in the compressor to produce the shortest possible output pulses.

To enable higher-order dispersion control with an optical filter therefore, the spectral bandwidth of the seed source should be larger than the spectral bandwidth of the optical filter. Moreover, smooth Gaussian, parabolically or rectangularly shaped input pulse spectra are desirable into the amplifier to minimize any unwanted pulse distortions due to self-phase modulations. Even in the absence of smooth Gaussian, parabolic or rectangular input pulses, strong spectral shaping in the power amplifier 123 can still produce the desirable effect of third-order dispersion compensation with self-phase modulation.

As an alternative to the use of an optical filter for third-order dispersion control in the chirped pulse amplification system displayed in FIG. 5, a seed source 101 with a specified spectral output can also be used. However, because the control of third-order dispersion is critically dependent on the input pulse spectrum, an implementation with an optical filter and a seed source bandwidth exceeding the bandwidth of the filter is easier to implement.

The control of third-order dispersion with self-phase modulation or the control of third-order dispersion in general can further be facilitated by the incorporation of stretcher fibers 120 with a value of third-order dispersion, which balances or reduces the absolute magnitude of the third-order dispersion of the compressor 127. As disclosed in U.S. patent application Ser. No. 09/576,722, such fibers with modified values of third-order dispersion can comprise conventional step-index and holey fiber, as well as photonic crystal fibers, as discussed in U.S. patent application Ser. No. 10/608,233, the disclosure of which is incorporated by reference in its entirety. U.S. Pat. No. 5,802,236 issued to DiGiovanni et al., U.S. Pat. No. 6,445,862 issued to Fajardo et al., U.S. Pat. No. 6,792,188 issued to Libori et al. and WO 02/12931 of Libori et al. disclose specific design examples for holey fibers with modified values of third-order dispersion.

Figure 5B:
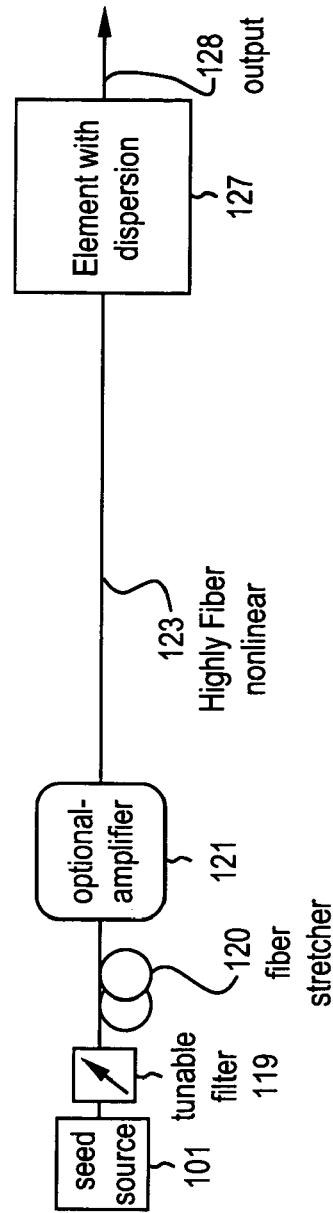
FIG. 5b is another embodiment of this higher order dispersion compensator.

FIG. 5b is another embodiment of this higher order dispersion compensator. It consists of an input pulse stretcher and an amplitude filter. These could be the same component such as a fiber grating, or separate such as a long fiber with dispersion and a filter. This creates a stretched asymmetrically shaped pulse that is input into a fiber that causes self-phase modulation. Thus the amount of phase shift is determined by the amplitude. This allows the correction of higher order dispersion. For systems of interest this fiber could also provide gain, or the gain could be provided by a separate fiber.

Equally, the cubicon pulses as described here can also be used to obtain high peak power stretched pulses, which can then be compressed in photonic crystal fibers as described with reference to FIGS. 1-4. Since photonic crystal fiber compressors produce negative values of third-order dispersion, cubicon pulses which produce positive values of non-linear third-order dispersion are preferred to enable efficient pulse compression. Such cubicon pulses can for example be generated by pulse injection on the blue side of the spectral gain peak. An implementation using cubicon pulses in conjunction with photonic fiber compressors is similar to the implementation shown in FIG. 1, where the fiber grating stretcher 103 is replaced with a length of fiber stretcher. Such an implementation is not separately shown.

Figure 9A:
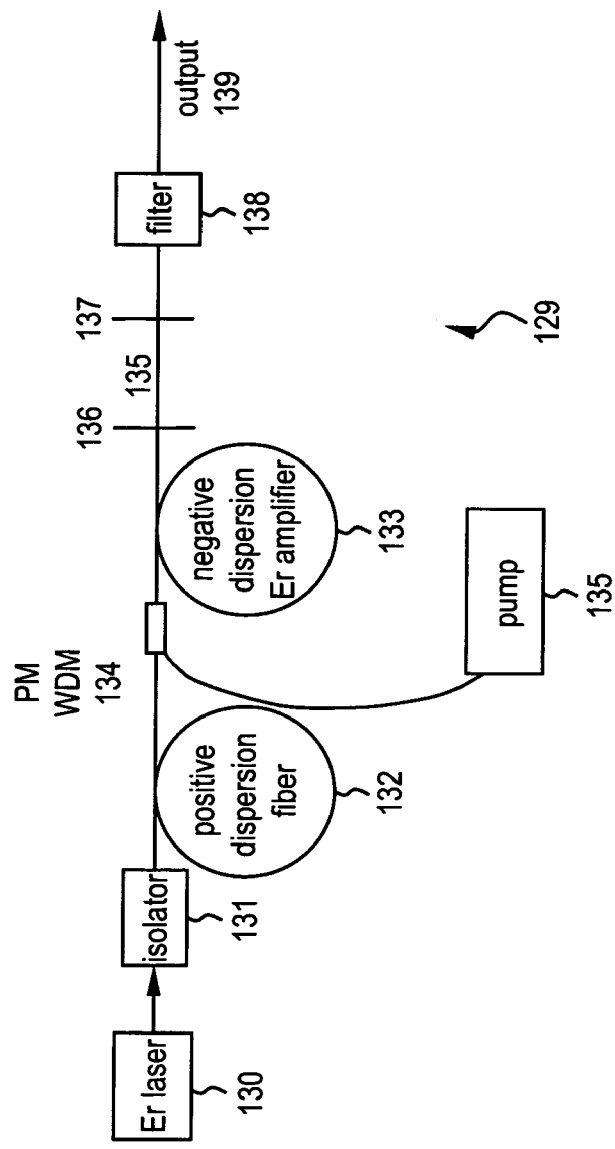
FIG. 9a is a diagram of an optimal modelocked Er oscillator amplifier system used in conjunction with an anti-Stokes frequency-shifting fiber for seeding of a short pulse Yb fiber amplifier.

Referring to FIG. 9a, a commercially usable anti-Stokes frequency shifted Er fiber laser system 129 is shown. An ultrafast Er (or Er/Yb) fiber laser 130 is used as the front end of the system. Such an Er fiber laser was for example described in U.S. application Ser. No. 10/627,069 and is not further discussed here. The output of the ultrafast Er fiber laser is transmitted through isolator 131 and a length of positive dispersion fiber 132 temporally stretches the pulses. A negative dispersion Er amplifier 133 amplifies the temporally stretched pulses. Herein, a positive dispersion fiber is referred to as non-soliton supporting fiber, and negative dispersion fibers are referred to as soliton supporting fiber. The Er fiber amplifier 133 is pumped via the wavelength division multiplexing (WDM) coupler 134 with a single-frequency pump laser 135. Ideally, all the fibers transmitting the pulses from the Er fiber lasers are polarization maintaining and spliced together in a polarization maintaining fashion to ensure optimum stability of the system. The output from the negative dispersion Er fiber amplifier 133 is injected into a highly nonlinear fiber 135, which is connected to the rest of the system via splices 136 and 137. The output of the highly nonlinear fiber is then spliced to the polarization maintaining pigtail of a tunable optical filter 138. The output of the system is designated with arrow 139.

The highly nonlinear fiber 135 is preferably dispersion flattened and has a value of dispersion at 1560 nanometers between −1 and −10 ps$^2$/km, i.e., the highly nonlinear fiber is preferably soliton supporting and has a reduced value of negative dispersion compared to a standard transmission fiber as used in telecommunications. Four-wave-mixing in the highly nonlinear fiber can thus produce a spectral output simultaneously near 1050 nanometers and near 3000 nanometers, where the long-wavelength output is strongly attenuated due to fiber absorption. The blue-shifted output in the 1 micrometer wavelength region is referred to here as the anti-Stokes output.

The positive dispersion fiber 132 produces positively chirped pulses, which the negative dispersion fiber 133 subsequently amplifies and simultaneously compresses. By amplifying positively chirped pulses in the negatively chirped fiber, the threshold for pulse break-up in the negative dispersion fiber can be minimized and a compressed pulse with a maximum pulse energy can be generated.

Figure 9B:
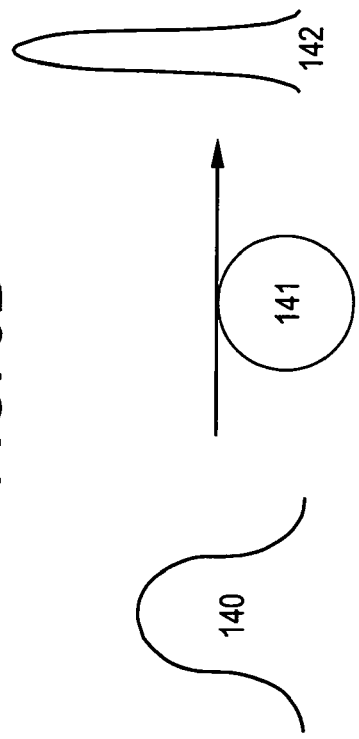
FIG. 9b is a diagram illustrating an optimum condition for stable anti-Stokes frequency shifting.

This is further illustrated in FIG. 9b. Line 140 represents the temporal profile of a positively chirped pulse, which is amplified in negative dispersion fiber 141. At the output of the negative dispersion fiber 141, a compressed and amplified pulse with a temporal profile schematically represented with line 142 is generated. Preferably, the pulse chirp at the input to fiber 141 and the length of fiber 141 are selected such that after linear amplification an optimally compressed pulse is obtained at the output of fiber 141.

Figure 10:
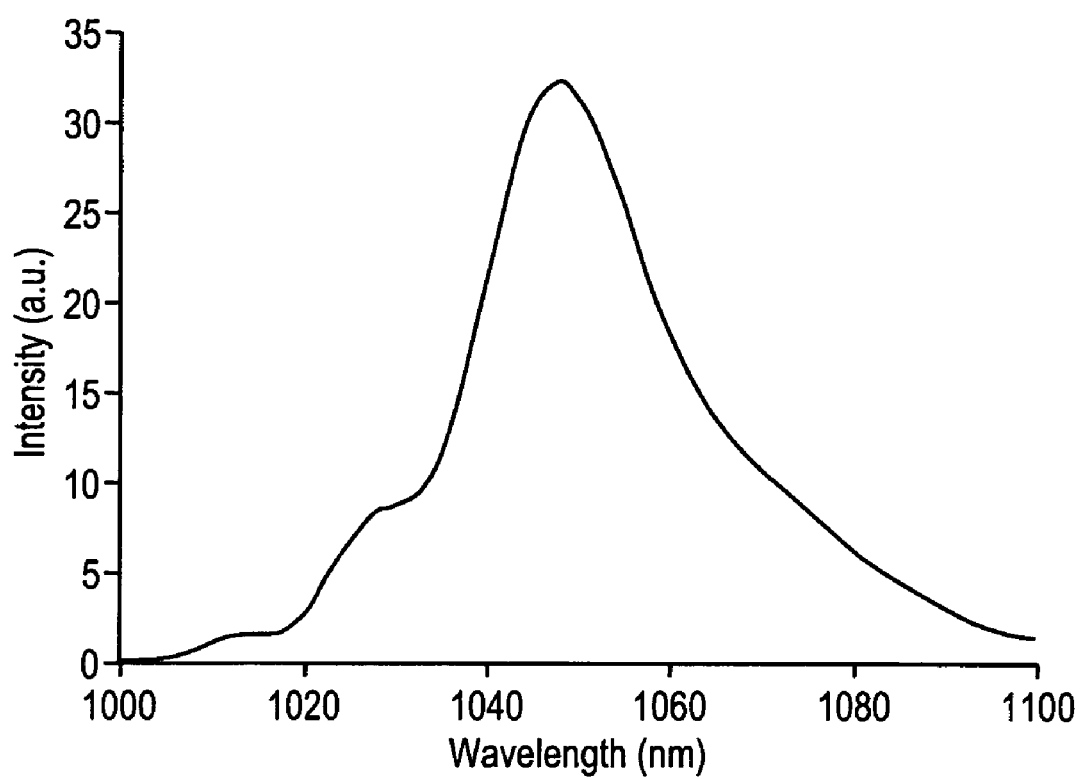
FIG. 10 is a diagram of an optical spectrum obtained with an anti-Stokes frequency shifted Er fiber laser.

In an actual system demonstration according to FIG. 9a, an Er laser produced 1.5 picosecond positively chirped pulses with a spectral bandwidth of 12 nanometers at a repetition rate of 70 megahertz and an average power of 5 milliwatts. Thus, the fiber 132 was eliminated. The pulses were amplified to a power level of 100 milliwatts in a 1.5 meter length of negative dispersion fiber 133 with a core diameter of 9 micrometers. A 12 centimeter length of the highly nonlinear fiber 135 was sufficient for spectral generation in the 1050 nanometers wavelength range. The anti-Stokes frequency shifted spectrum measured without filter 138 is shown in FIG. 10. An anti-Stokes pulse spectrum centered at 1048 nanometers with a spectral bandwidth of 30 nanometers was obtained. The average power integrated from 1000-1100 nanometers was around 3 milliwatts. Even with a spectral filter 138 having a 10 nanometer bandwidth, an average output power greater than 900 microwatts was obtained in the wavelength range from 1040-1060 nanometers. This output power is ideal for seeding of a typical Watt-level Yb fiber amplifier, where an average seed power of only 100-300 microwatts is required. Note that a change in pump power from the pump laser 135 did produce changes in the anti-Stokes frequency shifted spectrum; however, these changes were relatively complex and not linearly dependent on pump power. For a tunable laser, it is therefore preferable to fix the pump power from the pump laser 135 and to tune the bandpass filter 138.

Note that an alternative system concept, based on the use of near-bandwidth-limited 600 femtosecond pulses at the input to the 1.5 meter length of negative dispersion Er amplifier 133, also produced an anti-Stokes frequency shifted pulse spectrum near 1050 nanometers. However, when using near bandwidth-limited pulses to the input of the negative dispersion Er amplifier 133, soliton self-frequency shifting in the amplifier 133 cannot be prevented; as a result, the pulse spectrum amplified in amplifier 133 breaks up into Raman-shifted and non-shifted spectral components. The added noise from Raman-shifting as well as from the pulse break-up in amplifier 133 generates additional noise in the anti-Stokes frequency shifted output, making the output near 1050 nanometers essentially unusable.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. All U.S. Patents, publications and applications as mentioned herein are hereby incorporated by reference as if bodily included herein.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A fiber chirped pulse amplification system, comprising;
   a seed source;
   a pulse stretcher for temporally stretching pulses from said seed source;
   a non-linear amplifier configured as a cubicon pulse amplifier; and
   a pulse compressor; wherein
   said stretched pulses amplified in said amplifier are subjected to a substantial level of self-phase modulation, and
   said substantial level of self-phase modulation provides a level of third-order dispersion that is at least partially compensated by the level of third-order dispersion from said pulse stretcher and said pulse compressor.

2. A fiber chirped pulse amplification system for sub-50 picosecond pulses, comprising:
   a short pulse seed source providing sub-10 picosecond pulses;
   a pulse stretcher configured to temporally stretch the pulses from said seed source;
   at least one non-linear fiber amplifier configured to accept pulses with an input pulse spectrum and emitting amplified pulses with a certain output pulse spectrum, said input pulse spectrum being derived from said seed pulse source, but not necessarily identical to said seed pulse source;
   a pulse compressor having a level of second, third- and higher-order chromatic dispersion,
   wherein said fiber amplifier is configured such that said output pulse spectrum is wavelength-shifted with respect to said input pulse spectrum, and
   said fiber amplifier at least partially compensating for the third order dispersion of said pulse stretcher and compressor by self-phase modulation.

3. The amplification system for optical pulses according to claim 2, wherein said at least one amplifier is configured as a cubicon pulse amplifier.

4. A fiber chirped pulse amplification system for sub-50 picosecond pulses, comprising:
   a short pulse seed source providing sub-10 picosecond pulses;
   a pulse stretcher configured to temporally stretch the pulses from said seed source;
   at least one nonlinear fiber amplifier configured such that an output pulse spectrum is wavelength-shifted with respect to an input pulse spectrum thereof; and
   a pulse compressor;
   wherein said fiber amplifier is further configured to at least partially compensate for third order dispersion of said pulse stretcher and compressor by self phase modulation.

5. A fiber chirped pulse amplification system for sub-50 picosecond pulses, comprising:
   a short pulse seed source providing sub-10 picosecond pulses;
   a pulse stretcher configured to temporally stretch the pulses from said seed source;
   at least one fiber amplifier configured to accept said stretched pulses and outputting amplified cubicon pulses;
   a pulse compressor having a level of second, third- and higher-order chromatic dispersion; wherein
   said fiber amplifier is configured such that said cubicon pulses produce a nonlinear pulse chirp that is at least partially compensated by the level of third-order dispersion from said pulse stretcher and said pulse compressor.

6. The fiber chirped pulse amplification system according to claim 5, wherein said level of self-phase modulation is in the range of $0.3\text{-}10\pi$.

7. A fiber chirped pulse amplification system, comprising;
   a seed source;
   a pulse stretcher for temporally stretching pulses from said seed source;
   a non-linear amplifier configured as a cubicon pulse amplifier; and
   a pulse compressor; wherein the pulses amplified in said amplifier are subjected to a substantial level of self-phase modulation, and such that there is an observable increase in amplitude modulation of an output spectrum of said pulses as compared to an input spectrum thereof.

8. A fiber chirped pulse amplification system for sub-50 picosecond pulses, comprising;
   a short pulse seed source providing sub-10 picosecond pulses;
   a pulse stretcher configured to temporally stretch the pulses from said seed source;
   at least one fiber amplifier configured to accept pulses with an input pulse spectrum and emitting amplified pulses with a certain output pulse spectrum, said input pulse spectrum being derived from said seed pulse source, but not necessarily identical to said seed pulse source,
   a pulse compressor having a level of second, third- and higher-order chromatic dispersion,
   wherein said fiber amplifier is configured such that said output pulse spectrum is substantially gain narrowed with respect to said input pulse spectrum, and
   said fiber amplifier being further configured to at least partially compensate for the third order dispersion of said pulse stretcher and compressor.

9. The fiber chirped pulse amplification system according to claim 8, wherein
   said stretched pulses amplified in said amplifier are subjected to a substantial level of self-phase modulation, and
   said substantial level of self-phase modulation provides a level of third-order dispersion which at least partially compensates for the level of third-order dispersion from said pulse stretcher and pulse compressor.

10. The fiber chirped pulse amplification system according to claim 9, wherein said level of self-phase modulation is in the range of $0.3\text{-}10\pi$.

11. The fiber chirped pulse amplification system according to claim 9, wherein said level of self-phase modulation is manifested in an increase in amplitude modulation of the output pulse spectrum compared to the input pulse spectrum.

12. A fiber chirped pulse amplification system, comprising:
a short pulse seed source;
a pulse stretcher configured to temporally stretch the pulses from said seed source;
at least one fiber amplifier configured as a cubicon pulse amplifier, and
a pulse compressor having a level of third order dispersion partially corrected by self phase modulation within said fiber amplifier.

13. A fiber chirped pulse amplification system, comprising:
a short pulse optical source;
a pulse stretcher configured to temporally stretch the pulses from said source;
at least one nonlinear fiber amplifier configured to accept pulses with an input pulse spectrum and emitting amplified pulses with a shifted output pulse spectrum;
a pulse compressor having a level of third-order chromatic dispersion,
said nonlinear fiber amplifier being of a type which at least partially compensates for the third order dispersion of at least said compressor, and being operable in a large self-phase modulation regime of $0.3$-$10\pi$.

14. A fiber chirped pulse amplification system as claimed in claim 13, wherein the nonlinear amplifier is a nonlinear undoped fiber and a linear amplifier.

15. A fiber-based higher order dispersion control system, comprising;
an optical pulse source module producing stretched pulses with a given amount of higher order dispersion;
a non-linear cubicon pulse amplifier which subjects said pulses to self phase modulation during amplification, said self-phase modulation providing a level of third-order dispersion; and
a pulse compressor having a given amount of higher order dispersion; wherein through asymmetric pulse amplitude shaping followed by said self-phase-modulation in said amplifier, dispersion of an output may be controlled.

16. A system as described in claim 1, where the seed source is a bulk solid-state mode-locked laser.

17. A system as described in claim 1, where the seed source is a fiber mode-locked laser.

18. A system as claimed in claim 2, wherein said pulses are stretched to a width of approximately 100 ps.

19. A system as claimed in claim 4, wherein said pulses are stretched to a width of approximately 100 ps.

20. A system as claimed in claim 5, wherein said pulses are stretched to a width of approximately 100 ps.

21. A system as claimed in claim 8, wherein said pulses are stretched to a width of approximately 100 ps.

* * * * *